United States Patent [19]

Johnson et al.

[11] 4,087,324

[45] May 2, 1978

[54] PILE CONSTRUCTION

[75] Inventors: Alfred A. Johnson, Claymont; John T. Carleton, Elsmere, both of Del.

[73] Assignee: The United States of America as represented by the United States Department of Energy, Washington, D.C.

[21] Appl. No.: 253,908

[22] Filed: Oct. 30, 1951

[51] Int. Cl.² .............................................. G21C 5/02
[52] U.S. Cl. ....................................... 176/52; 176/84
[58] Field of Search ................... 204/154; 176/84, 52, 176/41

[56] References Cited

U.S. PATENT DOCUMENTS 2,708,656  5/1955  Fermi et al. ......................... 204/193

FOREIGN PATENT DOCUMENTS 861,390  2/1941  France .............................. 204/154.2

OTHER PUBLICATIONS

Cockcroft, "Nuclear Reactors in Scientific Experiments," *Endeavor* (London), vol. 9, Apr. 1950, pp. 55–63.
Nucleonics, Feb. 1950, pp. 54–61, an article by L. A. Ohlinger.
Nucleonics, Dec. 1949, pp. 38–49, an article by L. A. Ohlinger.
Atomic (Great Britain), Jun. 1951, pp. 176–180, an article on "Bepo".
A General Account of the Development of Methods of Using Atomic Energy for Military Purposes Under the Auspices of the U.S. Government, 1940–1945, by H. D. Smyth, for sale by Superintendent of Documents, Washington, D. C., pp. 82, 83, 84, 85, 102, 103, 104, 177–179.

*Primary Examiner*—Harvey E. Behrend
*Attorney, Agent, or Firm*—Dean E. Carlson; Frank H. Jackson

[57] ABSTRACT

A graphite-moderated, water-cooled nuclear reactor including graphite blocks disposed in transverse alternate layers, one set of alternate layers consisting of alternate full size blocks and smaller blocks through which cooling tubes containing fuel extend, said smaller blocks consisting alternately of tube bearing blocks and support block, the support blocks being smaller than the tube bearing blocks, the aperture of each support block being tapered so as to provide the tube extending therethrough with a narrow region of support while being elsewhere spaced therefrom.

1 Claim, 8 Drawing Figures

PILE CONSTRUCTION

The present invention relates to a neutronic reactor with a solid moderator designed to minimize the deleterious effects of high energy neutron irradiation of the moderator material, and to methods of operating neutronic reactors with solid moderators which minimize the deleterious effects of high energy neutron irradiation of the moderator.

It has been found, that prolonged operation of a neutronic reactor with a solid moderator will cause expansion of the moderator. Extruded moderator material expands normal to the axis of extrusion of the material, particularly when the reactor is operated at high neutron densities. Other transformations of irradiated materials also transpire, such as changes in electrical conductivity. These changes in the nature of materials produced by neutron bombardment are believed to be properties of crystalline materials and result from distortion of the lattice structure of the bombarded material. When a high energy neutron strikes one of the atoms of a crystal, the bonds which tie the atoms of the crystal together are placed under a severe strain, and under certain conditions one of the atoms will be displaced from its position in the lattice structure. This may merely cause a rearrangement of the atoms in the lattice structure of the crystal, or it may result in the bombarded atom entirely leaving the lattice structure and taking up a permanent interstitial position. This latter process is believed to be the one which occurs when crystalline materials are expanded by neutron bombardment.

If a solid moderator is used to construct a neutronic reactor, this expansion will eventually distort the reactor structure to an extent which will impair the operation of the reactor and limit its useful life. This is particularly true when a graphite moderator is used, or where the bodies of fissionable material used to initiate and sustain the neutron chain reaction are disposed within tubes traversing the moderator. In this latter case, expansion of the moderator will distort the tubes and the fissionable bodies will tend to jam in the tubes. If this occurs, is is necessary to disassemble the reactor and replace the expanded graphite with new materials.

It is one of the objects of the present invention to provide a neutronic reactor in which the expansion of the solid moderator as the result of prolonged neutron bombardment is minimized.

It is also an object of the present invention to provide a method of operating neutronic reactors with solid moderators that will reduce the expansion of the moderator material.

It is another object of the present invention to provide a neutronic reactor having a solid moderator with tubes bearing fissionable material traversing the moderator in which the temperature of the moderator along the length of the tubes and the temperature of the moderator adjacent to different tubes is maintained nearer a constant value than has heretofore been possible.

It is also an object of the present invention to provide a method of operating a neutronic reactor having a solid moderator with tubes bearing fissionable material traversing the moderator which maintains the temperature of the moderator along the length of the tubes and adjacent to different tubes at a relatively constant value.

Other objects and advantages of the present invention will become readily apparent upon a further reading of the specification, particularly when read in the light of the drawings in which.

Figure 1:
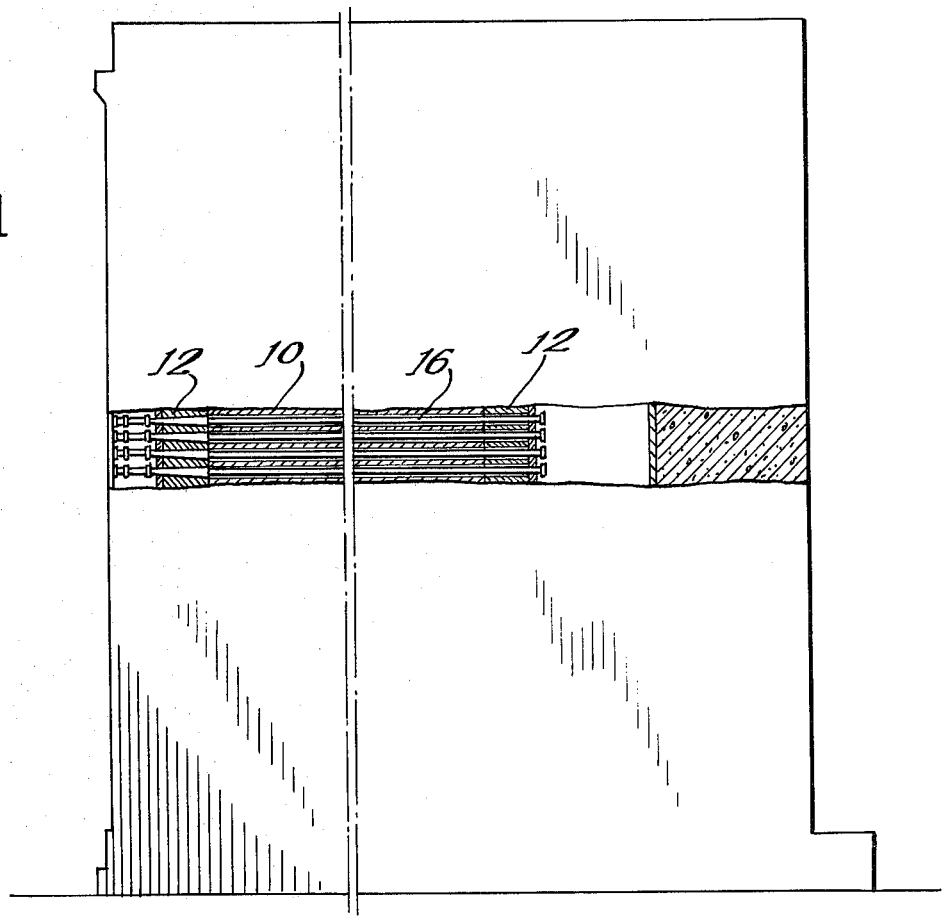
FIG. 1 is an elevational view of a neutronic reactor illustrating the invention, a portion of the reactor being cut away and in section.
Figure 2:
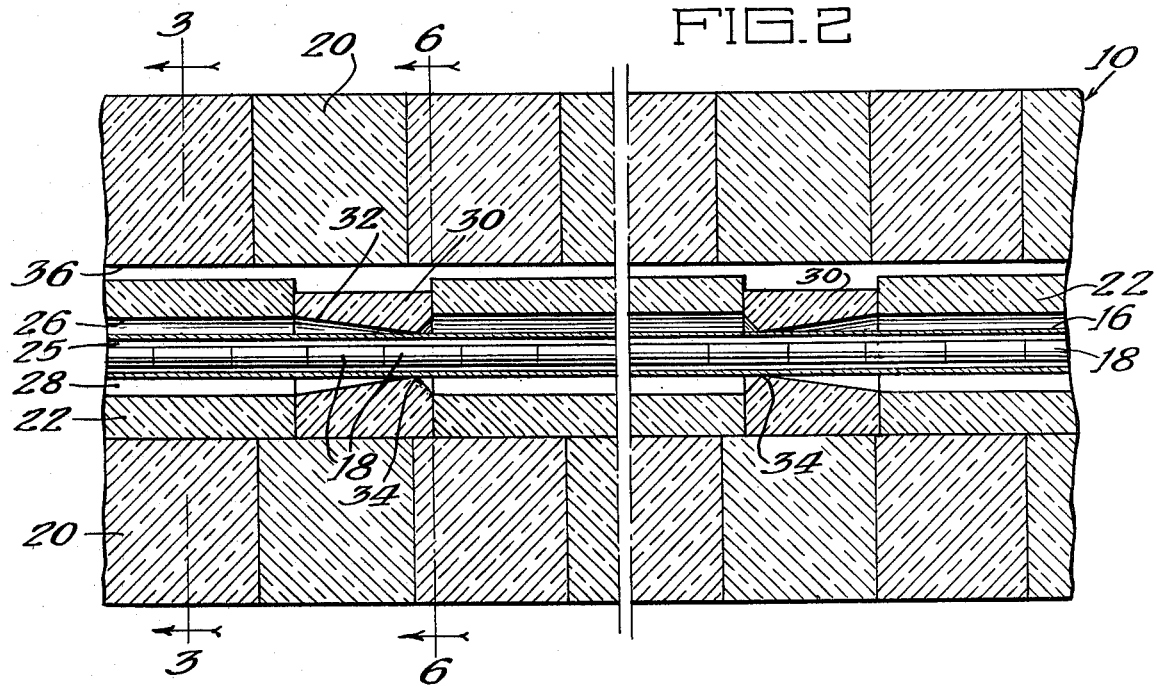
FIG. 2 is a fragmentary sectional view showing a portion of the reactor shown in FIG. 1 in greater detail.
Figure 3:
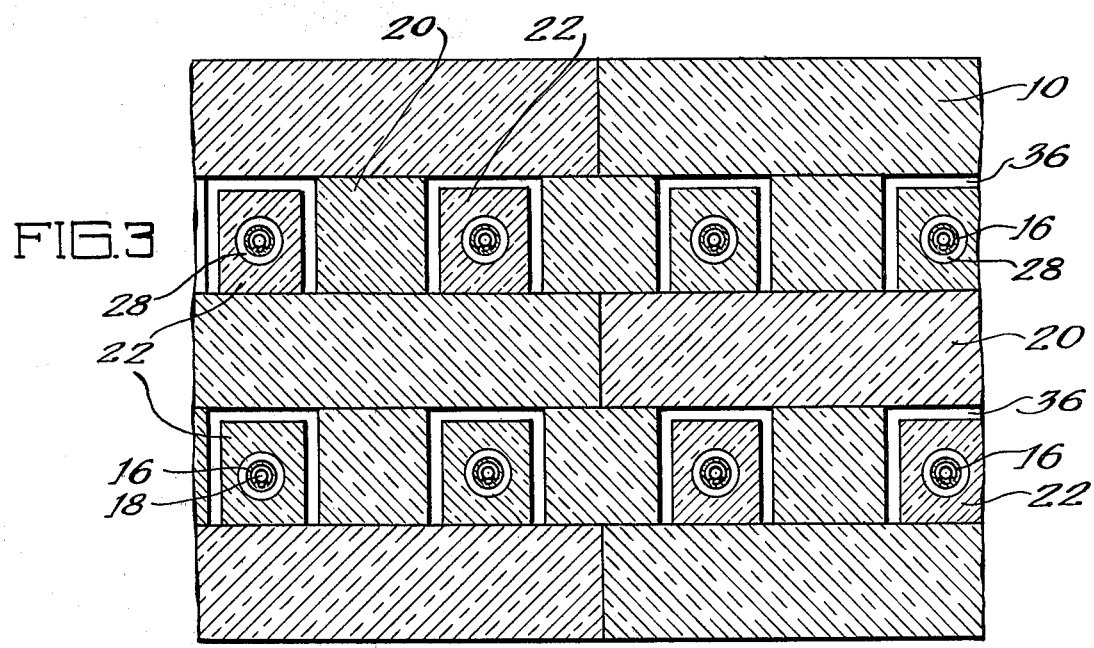
FIG. 3 is a sectional view of a portion of the reactor taken along line 3—3 of FIG. 2.
Figures 4, 5:
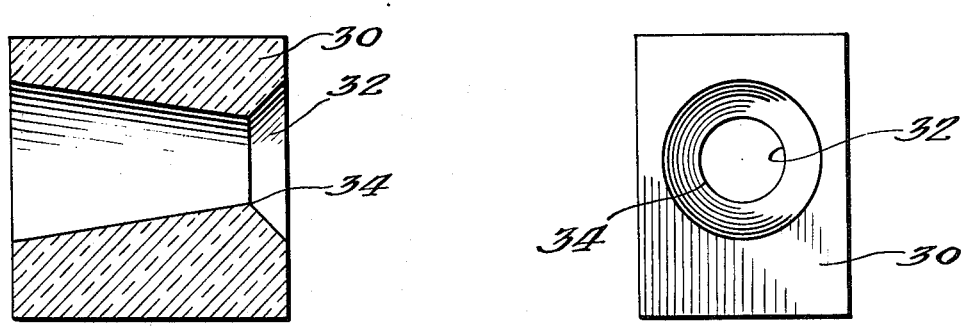
FIG. 4 is a longitudinal sectional view of one of the support blocks illustrated in use within the reactor in FIG. 2.
FIG. 5 is an end elevational view of the block shown in FIG. 4.
Figure 6:
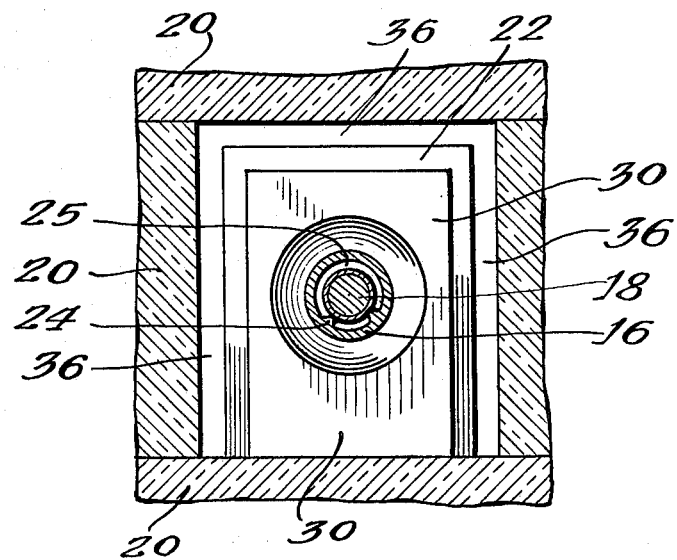
FIG. 6 is an enlarged fragmentary view taken along line 6—6 of FIG. 2.

Efforts have been made in the past to accommodate the expansion of a crystalline moderator structure in a neutronic reactor by allowing a space into which the moderator material may expand as it distorts through prolonged use. This expansion was also observed to be greatest in the moderator material adjacent to the fissionable material in the reactor, and to be the greatest normal to the axis of extrusion when the moderator materials were produced by the extrusion process. The application of John T. Carleton, Ser. No. 157,287, filed Apr. 21, 1950 now U.S. Pat. No. 3,200,046 dated Aug. 10, 1965, discloses a neutronic reactor constructed with spaces to accommodate the expansion of the moderator material which expand as a result of prolonged use of the reactor.

The present invention maintains the temperature of the crystalline moderator material at a sufficiently high value to facilitate "self-healing." Self-healing is the process which occurs when the temperature at which the bombarded crystalline material is maintained sufficiently high to facilitate atoms in resuming the normal crystalline lattice structure. This method of curing the deformations in a crystalline substance was first discovered by Eugene P. Wigner and described in patent application Ser. No. 605,958, filed July 19, 1945 now abandoned.

A neutronic reactor constructed according to the present invention may consist of a moderator 10 constructed of solid material disposed within a radiation shield 12 which surrounds the moderator 10. A plurality of parallel tubes 16 traverse the moderator 10, and the ends of the tubes 16 extend through the shield 12. Within the tubes 16 are disposed a plurality of bodies of thermal neutron fissionable material 18 such as plutonium or natural uranium. The bodies of fissionable material 18 are mounted centrally within the tubes 16 on a pair of ribs 24 in each tube 16. This leaves a channel 25 in each tube 16 for the circulation of a fluid coolant to limit the temperature of the fissionable material 18 within the tube 16. Water has been found to be a suitable coolant to circulate through the channels 25 of a neutronic reactor of this type, and conventional devices may be used to pump the fluid coolant through the channel 25. Neutronic reactors with this construction are described in greater detail by the application of Edward C. Creutz, Leo A. Ohlinger, Alvin M. Weinberg, Eugene P. Wigner and Gale J. Young, Ser. No.

574,153, filed Jan. 23, 1945 now U.S. Pat. No. 2,910,418 dated Oct. 27, 1959 and Fermi et al U.S. Pat. No. 2,708,656, dated May 17, 1955. The moderator material 10 may be in the form of rectangular blocks 20 and 22 and may consist of extruded graphite which has been purified to remove materials that do not have low neutron capture cross sections, i.e. materials which do not exhibit the property of having a small probability of capturing an incident neutron. If other solid moderator materials are used, such as beryllium or beryllium oxide, they likewise should contain as few impurities that will absorb neutrons as possible, in order to make available as many neutrons as possible for the chain reaction. The graphite blocks 20 and 22 are stacked to form a cube with the axes of the bars in alternate layers being disposed normal to each other. The tubes 16 are disposed parallel to each other within alternate layers of graphite blocks 20 and 22 and are mounted through the center of blocks 22 which are termed "tube bearing blocks." The cross section of the tube bearing blocks 22 is smaller than that of the other blocks 20 which make up the moderator 10. Between each pair of tube bearing blocks 22 is disposed a larger block 20. The tube bearing blocks 22 are provided with central channels 26 in which the tubes 16 are disposed, but the channels 26 are of greater cross section than the tubes 16, thus leaving a gap 28 between the tubes 16 and the tube bearing blocks 22.

At the end of each tube bearing block 22 is disposed a tube support block 30 for maintaining the tubes 16 centrally within the channel 26 in the tube bearing blocks 22. An aperture 32 extends through the support block 30 and has dimensions at the surface of the support block 30 approximately equal to the cross section of the channels 26, but tapering down to a circular aperture with a diameter approximately equal to the outer diameter of the tube 16. Thus, the aperture 32 within the support blocks 30 tapers from each end in the form of a cone into a supporting ring 34 which is disposed nearer one of the end surfaces of the supporting block 30 than the other end surface. Greater expansion of the supporting block 30 is also permissible since the transverse cross section of the block 30 is smaller than the transverse cross section of the tube bearing blocks 22. It is also to be noted that a gap 36 surrounds three of the sides of the tube bearing blocks 22 and support blocks 30, and that this gap 36 is formed by mounting the smaller tube bearing blocks 22 and support blocks 30 in a volume sufficient to accommodate the larger blocks 20. In this manner, the gap 36 is disposed on three of the four sides of all tube bearing blocks 22 and support blocks 30, and the second gap 28 is disposed between the tube bearing blocks 22 and the tubes 16.

The neutron reproduction ratio for the reactor described above will be lower as the result of the gaps 28 and 36 than it would be if the reactor were constructed without the gaps 28 and 36, at least before the chain reaction has begun and the temperature of the reactor is around the ambient temperature. This is largely because the less dense gas within the gaps 28 and 36 will not be as effective in reducing the energies of the neutrons as the moderator blocks 20 and 22. This deleterious effect of the gaps, however, is completely overcome by other changes in the operating characteristics of the reactor when the reactor is operating, as will be explained later. Also, the gas disposed within the gaps 28 and 36 should have a neutron absorption cross section at least as low as that of the material of the moderator 10 and the gas disposed in gap 28 must also have a relatively low thermal conductivity in order to permit substantial temperature gradients to exist across the gap 28. For these reasons helium has been found to be a suitable gas for this purpose.

In the particular construction described, the tubes 16 are disposed in a rectangular lattice with each tube spaced from adjacent tubes by $8\frac{3}{8}$ inches. The tubes 16 are constructed of aluminum with an inner diameter of approximately 1.611 inch and an outer diameter of approximately 1.729 inch leaving the channel 25 for the coolant fluid which is water. The fissionable bodies 18 are approximately 1.44 inch in diameter, the outer approximately 0.028 inch being an aluminum jacket and the inner approximately 1.36 inch being natural uranium.

When the neutronic reactor is operating, the radiations set up by the reaction are partially absorbed within the reactor, and partially escape from the reactor. When these radiations are absorbed within the reactor, they raise the temperature of the material absorbing them. It has been found that approximately 6% of the total amount of heat generated within the reactor with a graphite moderator as a result of radiation absorption occurs in the graphite moderator of the reactor. Thus, the heat insulating gap 28 disposed between the cooled tubes 16 and the moderator 10 of the reactor, will elevate the temperature of the moderator 10. As previously stated, the deformation of crystalline material by neutron bombardment is greatly reduced if that material is maintained at an elevated temperature during the bombardment, and in fact, deformation existing in such materials can be at least partially corrected by raising the temperature of the materials for a period of time.

Figure 7:
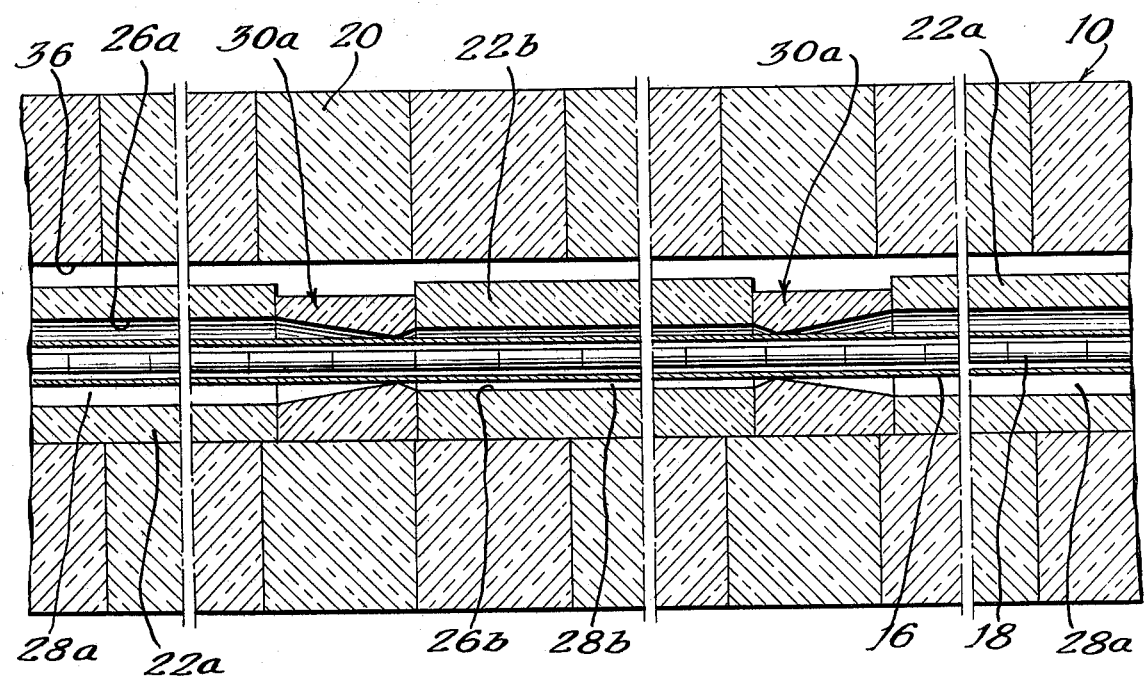
FIG. 7 is a fragmentary sectional view of another embodiment of the reactor, the view corresponding generally to that of FIG. 2 of the first embodiment.
Figure 8:
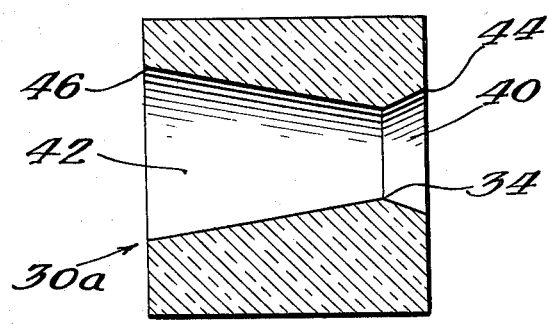
FIG. 8 is a longitudinal sectional view of one of the support blocks shown in FIG. 7.

A second embodiment of the invention is shown in FIGS. 7 and 8. The reactor constituting this embodiment differs from that shown in FIGS. 1 through 6 in that different portions of the gap between the coolant tubes and the tube bearing blocks have different sizes. The reactor is identical with the reactor of the first embodiment in other respects, so the same designations for the elements has been used in FIGS. 7 and 8, except where structural differences occur.

As shown in FIG. 7, the tubes 16 extend through the reactor moderator 10 surrounded by tube bearing blocks 22a and 22b. Blocks 22a are provided with central channels 26a, and blocks 22b have central channels 26b, the diameter of the latter channels 26b being smaller than the diameter of the former channels 26a. Hence, the gap 28a formed between the tubes 16 and the tube bearing blocks 22a is larger than the gap 28b between the tube bearing blocks 22b and the tubes 16. Gap 28b is positioned near the center of the reactor where the greatest neutron flux density exists, since it provides less thermal insulation than gap 28a. Support blocks 30a are disposed between tube bearing blocks 22a and 22b to support the tubes 16. They differ from the support blocks 30 of the first embodiment in that the two conical segments 40 and 42 extending from the supporting ring 34 to the periphery of the block 30a have mouths 44 and 46 of different diameters. The mouth 44 has the same diameter as the channel 26b, while mouth 46 has the same diameter as channel 26a, so that the blocks 30a may be properly aligned with both channels 26a and 26b.

While only two gaps 28a and 28b have been illustrated, more gaps of different diameter or a gap with a continuously varying diameter may be used equally well, as will be explained.

A suitable operating temperature for a graphite moderator which will minimize the amount of deformation of the moderator is a temperature of 250° to 450° C. The length of the gap may be calculated for any reactor by the formula $$L = (KA\Delta T)/Q$$

where $K$ is the thermal conductivity of the gas disposed within the gap, $A$ is the area of the surface of the channel forming the gap. $\Delta T$ is the temperature gradient desired across the gap, and $Q$ is the quantity of heat transferred across the gap per unit of time.

Since the maximum neutron flux density within a reactor occurs at its center, the maximum amount of heat liberated within the reactor will also occur at the center, and the smallest gap between the moderator and the coolant tube which will elevate the temperature of the moderator sufficiently high will also occur at this point. For calculation purposes, it may be assumed that the neutron flux along any of the tubes 16 traversing the moderator 10 will be a cosine distribution, the maximum flux density occurring at the middle of the tubes 16 and substantially zero neutron flux occurring at the ends of the tubes 16. If it is assumed that the reactor is to be operated to develop 350 kilowatts of heat in the tube 16 which passes through the center of the reactor and that the length of the tube is 26 feet, the reactor being a 26 foot cube, then the amount of heat liberated at the center of this tube is approximately 21.5 kw. per foot. Of this amount, 6% is liberated in the graphite moderator or 1.35 kw. per foot. Converting this figure, there are 4610 B.T.U. liberated per hour per foot measured along the length of the coolant tube at the center of the reactor. A suitable temperature to maintain the graphite is a temperature of 600° F., and if the water temperature flowing through the tubes 16 is approximately 120° F., and helium with a thermal conductivity of 0.11 B.T.U./sq. ft./hour/°F./ft. is assumed to be the gas within the gap 28, then it is clear from the equation above, that the gap should be 0.044 inches to produce the desired result.

However, the amount of heat liberated near the end of the charge of fissionable material 18 in this tube 16 will be far less than the heat liberated at the center of the tube 16. It has been found that only approximately 15 percent of the heat liberated at the center of the reactor is liberated near the ends of the charge of fissionable material 18 in the tube 16. Substituting these figures in the equation above, indicates that the gap 28 may be 0.34 inch at this point. It is also true, that the heat liberated in the graphite adjacent to the tubes 16 remote from the one traversing the center of the reactor will be but a small percentage of that calculated above. The gap 28 is constructed to vary in different portions of the reactor and in different portions along the same tube in the reactor in order to maintain the temperature of the graphite moderator at a constant throughout the reactor. In a particular construction, it has been found that suitable dimensions for the gap 28 vary in different parts of the reactor from 0.032 inch to 0.25 inch, the gap being smallest at the center of the reactor and increasing with the distance from the center of the reactor, and that gap widths greatly exceeding 0.25 inch become impractical due to mechanical considerations. Since, as previously stated, the tube spacing is 8⅜ inch, the blocks 20 are 4 3/16 inches on a side. The blocks 22 and 30, of course, have smaller dimensions. In accordance with the teachings of Carleton application Ser. No. 157,287, previously referred to, to the effect that the tube-bearing blocks are 4.06 inch on a side when the other blocks are 4.18 inch on a side, blocks 22 and 30 may be as small as 4.06 inch on a side, although they will preferably be somewhat larger than this, since according to the present invention they will be hotter than tube-bearing blocks of the Carleton application and so will expand less. limit the permissible gap, the one being used having a 4 3/16 inch square cross section.

The neutron reproduction ratio of the reactor will be approximately the same as that of a similar reactor constructed without the gap 28, at least when the reactor is operating. It will be determined by the same factors that dictate the neutron reproduction ratio for a reactor that does not have a gap 28, but may be affected additionally by the neutron absorption cross section of the gas within the gap 28, the poorer moderating properties of the less dense material in the gap 28, the elevated temperature at which the moderator 10 operates, and other factors. The gain in reactivity caused by the elevated temperature of the moderator results at least partially from decreasing the non-fission neutron absorption within the reactor and will, in general, overcome a decrease in the neutron reproduction ratio caused by poorer properties of the gases used in the gap 28. In the particular reactor described, the neutron reproduction ratio was decreased by approximately 1/20 percent when the reactor was at ambient temperature, and increased by about ½ percent when at operating temperature, the reactor using natural uranium and having the given dimensions.

The man skilled in the art will readily devise many other reactors differing from the one specifically described. However, it is intended that the scope of the present invention be limited by the appended claims rather than by the specific reactor disclosed.

What is claimed is:

1. A neutronic reactor comprising a first plurality of solid graphite blocks extending in one direction and arranged in vertically spaced horizontal layers, a second plurality of solid graphite blocks arranged in horizontal rows transverse to the first plurality of solid graphite blocks and serving to space the layers thereof from one another, apertured tube-bearing graphite blocks arranged in horizontal rows in the spaces between the rows of the second plurality of solid blocks and being of smaller cross-sectional dimensions than the second plurality of blocks so as to be spaced on at least two sides from the first and second pluralities of blocks, graphite support blocks located in the same horizontal rows as the tube-bearing blocks so as to alternate therewith and being of smaller cross-sectional dimensions than the tube-bearing blocks so as to be spaced on at least two sides from the first and second pluralities of blocks, tubes for cooling water extending through the apertures in the tube-bearing and support blocks, the aperture of each support block being tapered so as to provide the tube extending therethrough with a narrow region of support while being elsewhere spaced therefrom, the aperture of each tube-bearing block being larger than the tube extending therethrough so as to be everywhere spaced from said tube, and bodies of thermal-neutron-fissionable material disposed within the tubes, helium being provided in the spaces between the tubes and the apertures in the tube-bearing blocks and support blocks.

* * * * *